United States Patent [19]

Mantellina et al.

[11] Patent Number: 4,571,676
[45] Date of Patent: Feb. 18, 1986

[54] MEMORY MODULE SELECTION AND RECONFIGURATION APPARATUS IN A DATA PROCESSING SYSTEM

[75] Inventors: Calogero Mantellina, Cerro Maggiore; Daniele Zanzottera, Busto Garolfo; Marco Gelmetti, Milano, all of Italy

[73] Assignee: Honeywell Information Systems Italia, Milan, Italy

[21] Appl. No.: 422,772

[22] Filed: Sep. 24, 1982

[30] Foreign Application Priority Data

Nov. 24, 1981 [IT] Italy .............................. 25266 A/81

[51] Int. Cl.[4] ...................... G06F 13/00; G06F 12/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,292,151 | 1/1966 | Barnes et al. | 364/200 |
| 3,555,513 | 1/1971 | Hauck et al. | 364/200 |
| 4,001,786 | 1/1977 | Boehm | 364/200 |
| 4,025,903 | 5/1977 | Kaufman et al. | 364/200 |
| 4,236,207 | 11/1980 | Rado et al. | 364/200 |

*Primary Examiner*—Eddie P. Chan
*Attorney, Agent, or Firm*—Nicholas Prasinos; John S. Solakian

[57] ABSTRACT

A memory module selection and reconfiguration apparatus in a data processing system wherein a modular working memory formed by a plurality of memory modules sends to a central processing unit information related to the capacities of the constituting modules (M1, M2, M3, M4) during the system initialization. The central unit processes such information and provides memory, via a channel (30), with information representative of the capacity of the first modules (G1), of the sum of the capacities of the first and second module (G2), of the sum of the capacities of the first, second and third module (G3) and so on, up to the total capacity of the working memory. This information is stored into registers (31, 32), each one related to a possible module, of a module selection unit included inside the working memory. When the memory is addressed, the most significant address portion (BA 03–06) is compared simultaneously by several comparators (33, 34, 35, 36), one for each register, with the content of the several registers. The result of the comparison from the comparators are applied to a decoder (37) which generates signals selecting one among the several memory modules.

2 Claims, 4 Drawing Figures

FIG. 1  CENTRAL UNIT

MEMORY MODULE SELECTION AND RECONFIGURATION APPARATUS IN A DATA PROCESSING SYSTEM

BACKGROUND OF THE INVENTION

1. Field of the Invention

The present invention relates to a memory module selection and reconfiguration apparatus in a data processing system.

2. Description of the Prior Art

Most data processing systems presently used provide the opportunity for increasing the capacity of the working memory in order to fulfill new requirements.

This is commonly attained by arranging the working memory modularly; i.e., by having a variable number of identical memory modules housed into a unit which is designed to contain a certain maximum number of modules. A memory module has a predetermined capacity (for instance 128K bytes) and is implemented with printed circuit boards of predetermined sizes and by a denoted number of standard integrated memory components.

Because of rapid changes in technology, the manufacturers of data processing systems are faced with the problem of upgrading the working memory at minimum cost. Because of such progress in new integrated memory components which have greater and greater capacity, a memory module may be built which has a greater capacity than it had (for instance double or quadruple) while at the same time maintaining the size of its memory board unchanged. Thus the capacity of a working memory may be increased not only by increasing the number of memory modules, but also by utilizing memory modules of greater capacity. Moreover it is unnecessary to remove the fewer capacity modules already installed. In such a way it is possible to obtain a working memory with a capacity variable as a function of the number and type of modules, and in which modules of different capacity are present at the same time. However there is a problem in addressing such memories. Prearranged circuits are required that can address any of the several modules of the working memory so that the several modules may be addressed as if they constituted an addressable continuous space of one memory only.

Because in data processing systems processors, working memories and peripheral units are all interconnected via busses which define a common interface for several types of equipments, it is not possible to perform the required address conversion outside the working memory without affecting the interfaces of all the equipment. Such conversion must therefore occur within the working memory and must be performed with simple and fast circuits so as not to introduce unacceptable delays in the memory access times and further increase the complexity and the related cost of such circuits. A partial solution to this problem is described in U.S. Pat. No. 4,001,786. According to the mentioned patent a memory unit comprises an ordered plurality of memory modules with each module including a module selector which receives at its inputs a suitable part of the memory addresses in the form of signals representative of the capacity of the related module and other signals representative of the sum of the capacities of the modules preceding the considered module. Referring to each module, the related selector comprises a network for summing the capacities of the preceding modules, a register for storing such sum, a network for subtracting the sum contained in such register to the received memory address part, a comparison network for determining if the sign of the subtraction operation is positive, negative or null and, a function of the result, for enabling the selection of the related module. The proposed solution is partial because it requires a great number of components and therefore is complex and expensive. Additionally the selection of a memory module is conditioned on the joint occurrence of two conditions; i.e., that the address has to be greater than the capacity of the modules preceding the considered one and lesser than the memory capacity given by the sum of the capacity of the preceding modules and by the capacity of the considered module. This requires the execution of a logic AND operation involving a certain delay time which, however short, cannot be avoided and is due to the signal propagation time in the logical circuits. The above mentioned comparison system utilizing first a subtraction operation and then a comparison operation, is relatively slow. Add this disadvantage to the complexity of hardware components that the system requires and we have an inefficient apparatus.

OBJECTS OF THE INVENTION

The disadvantages present in the solutions proposed by the prior art are overcome by the memory module selection and reconfiguration apparatus of the present invention which has the advantage of using a minimum number of components and the further advantage of introducing minimum selection delays.

An object of the invention, therefore, is to provide an improved addressing apparatus and method.

Still another object is to provide an improved addressing apparatus having a reduced number of components.

Yet another object of the invention is to provide an improved addressing operation which is faster than prior art devices.

SUMMARY OF THE INVENTION

According to the invention these advantages are obtained by assigning to the central unit of the system predetermined processing functions which are executed during the initialization or the reconfiguration of the system and by further providing the memory with an image of its composition. Such image is stored in suitable memory registers and defines for each memory module the capacity of such module plus the capacity of the preceding modules. A comparator is coupled to each memory module. The comparator receives as inputs the most significant bits of the memory address as well as the memory capacity of the considered module plus that of the preceding modules. The comparator determines whether or not the memory address is lesser than the related comparison capacities and, depending on the results of such comparison, selects through a decoder the proper memory module. Also an "overflow" apparatus is provided to signal if the memory address exceeds the capacity of the installed working memory.

BRIEF DESCRIPTION OF THE DRAWINGS

These and other features of the invention and the related advantages will appear more clearly from the following description of a preferred embodiment of the invention and from the following description of a preferred embodiment of the invention and from the accompanying drawings where:

FIG. 1 shows in block diagram a data processing system including the present invention.

DESCRIPTION OF THE PREFERRED EMBODIMENTS

Figure 2:
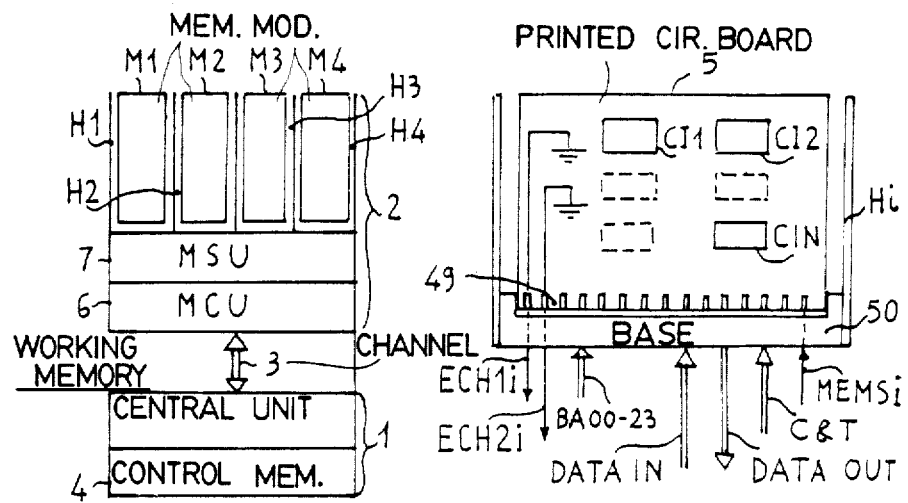
FIG. 2 shows in schematic form a memory module.

FIG. 1 shows in block form a data processing system using a memory module selector according to the invention. The system comprises a central unit 1 and a working memory 2 interconnected through a channel 3 comprising a plurality of leads. Through channel 3 central unit 1 sends to memory 2 timing signals, commands, addresses, data to be written into memory and may receive from memory 2 read data and status information. Central unit 1 is provided with a control memory 4 to store control microprograms managing its operation. For purposes of the present invention any additional information about central unit 1 and channel 3 is unnecessary because the invention may be used with any type of central unit and connection channel. Working memory 2 comprises a memory control unit MCU 6, a memory module selector MSU 7 and a plurality of memory modules which may be installed in any number varying from one up to a maximum of four ($M_1$, $M_2$, $M_3$, $M_4$) in related ordered housing of a memory frame ($H_1$, $H_2$, $H_3$, $H_4$). The capacity of each of the memory modules may be selected from different values, that is for instance, 128K words, 256K words, 512K words. It is clear that, according to the number and the capacity of the installed modules, the total capacity of memory 2 may vary from 128K to 2M words per multiples of 128K words with the only exception being the intermediate total capacity of 1920K words. Each memory module with capacity greater than 128K words, that is 256K and 512K words, may be considered comprised respectively of two and four blocks of unitary capacity 128K, so that the memory may be considered as comprised of a plurality of blocks partitioned in one or more modules. The binary addressing of a word inside a block of 128K words requires 17 bits. The binary addressing of a word inside a memory space constituted by 2M words requires 21 bits. Central unit 1 can, therefore, address a word within memory 2 with a binary code of 21 bits. However, for a greater generality central unit 1 is able to address up to 16M words utilizing a binary code of 24 bits. This permits the connection of central unit 1 to working memories with capacities greater than the one considered here. Working memory 2 therefore has a binary addressing code of 24 bits. The less significant 17 bits of such 24 bits allow the identification of a memory location within a block while the following most significant 4 bits allows the identification of a memory block 1. The 3 more significant bits are unused in the described example.

FIG. 2 shows in schematic form a memory module like $M_1$, $M_2$, $M_3$, $M_4$ and the related housing. The module is substantially comprised of a printed circuit board 5 provided with a connector 49. Such connector, through a base 50 which is part of housing Hi, in which the module is installed, allows the connection of board 5 to other boards constituting memory control unit MCU 6 and memory module selector MSU 7. Leads for signal transmission are connected to base 50 of memory module board 5. More particularly, two leads ECH1i, ECH2i send from board 5 to control unit MCU 6 a 2 bit binary signal indicative to the capacity of the memory module. A group of leads BA00–23 receive from control unit MCU 6 a binary addressing code, of which only the less significant bits are used. A group of leads DATA IN receive from control unit MCU 6 the binary information to be written into the memory module. A group of leads DATA OUT send the binary information read out from the memory module from board 5 to control unit MCU 6. A group of leads C&T receive from control unit MCU 6 timing and command signals. Lead MEMS i receives from module selector MSU 7 a selecting and module enabling signal. As is well known in the art, the groups of leads BA00–23 DATA IN, DATA OUT may comprise a single group of leads for bidirectional information transfer. The group of leads may be used in different and subsequent time intervals for the bidirectional transfer of addresses and data. A suitable number of memory integrated circuit packages CI1, CI2, ..., CIN is mounted on board 5. The memory capacity of the module depends on the number of the installed packages and on their capacity. Leads ECH1i, ECH2i, through connector 49, base 50, may or may not be connected to ground inside board 5 according to the function of the memory capacity installed within the module. However at least one of such leads is connected to ground.

As it will be seen infra, each of leads ECH1i, ECH2i is also connected within control unit MCU 6 to a positive voltage source through a pull-up resistor so that it may be held at electrical/logical level 0 or 1 according to whether it is respectively connected to ground or not within the module. The electrical/logical levels present on leads ECH1i, ECH2i are indicative of the memory capacity of the module installed into housing Hi. For example the correspondence between logic level and capacities may be the one shown in the following table:

| ECH1 | ECH2 | Capacity |
| --- | --- | --- |
| 1 | 0 | 128 words |
| 0 | 1 | 256K words |
| 0 | 0 | 512K words |
| 1 | 1 | 0 words (the board is missing and therefore all leads are disconnected from ground). |

Figure 3:
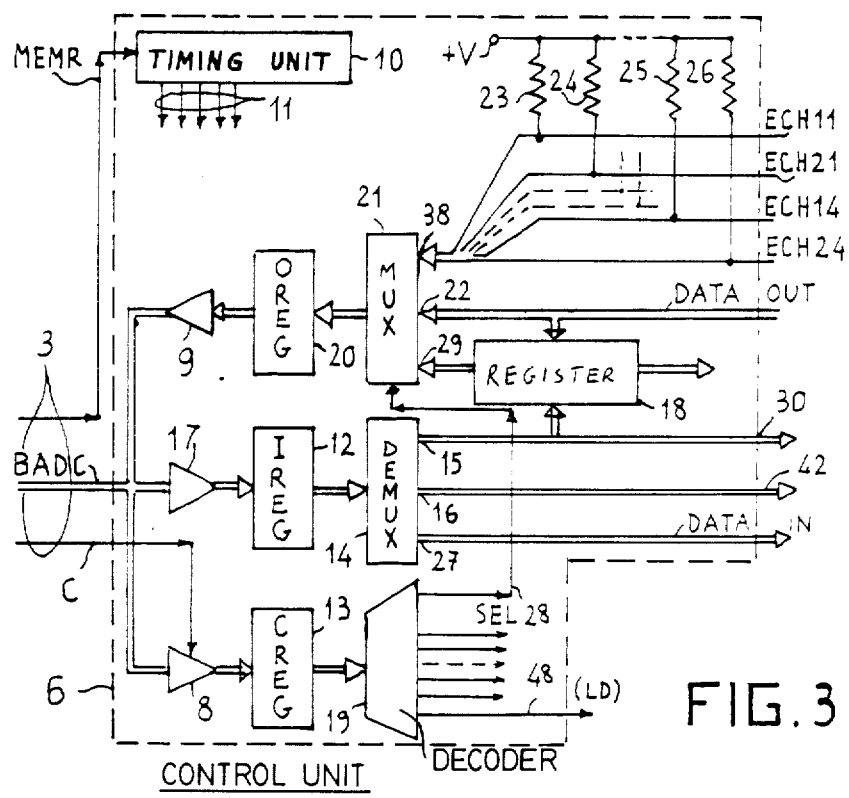
FIG. 3 shows in schematic form the architecture of the memory control unit.

FIG. 3 shows in schematic form the control unit MCU 6 of memory 2. Control unit 6 receives an information set via channel 3. Channel 3 comprises a predetermined number or leads. For example a lead MEMR sends a memory access request to memory 2 from central unit 1. A lead C sends a command signal to memory 2 comprising the information set present on the other leads and a group of leads BADC or bidirectional bus for transferring to/from memory 2 information which may be commands, addresses or data. This interface structure is merely illustrative of the most recent interface architectures which are used in data processing systems. However for the purposes of the instant invention, any other communication interface may be utilized. Bus BADC is connected to the inputs of two groups of tristate gates 17, 18 and to the outputs of a group of tristate gates 9. Lead MEMR is connected to the enabling input of a timing unit 10 generating on a group of leads 11 timing signals which provide timing for the operations performed by the electronic components of module control unit 6. Lead C is connected to the enabling input of tristate group 8 and enables such group to transfer the information present on bus BACD.

Outputs of tristate groups 17, 8 are connected to the inputs of two registers 12, 13 respectively. Register 12 acts as input register (I REG) for the information provided to the memory and its outputs are connected to the inputs of a demultiplexer 14 having output groups 15, 16, 27. Output groups 15 may, for instance, transfer information to other internal registers 18 of control unit 6. Output group 16 transfers addresses to module selection unit 7 and to the several modules, while output group 27 transfers to the several modules the inputted data. Register 13 (CREG) acts as input register for the commands. Its outputs are connected to the inputs of a decoder 19 which generates on its outputs some command signals. The command signals are timed by AND-ing them with suitable timing signals and are used partially inside control unit 6 for enabling the loading/unloading of registers, the selection of multiplexers/-demultiplexer/etc. They are also used partially outside control unit 6 for enabling read/write/refresh operations in the memory modules. Tristate group 9 has its inputs connected to the outputs of a register 20 (O REG) which receives information as inputs through multiplexers 21. An input group 29 of multiplexer 21 is connected to the outputs of internal register 18. Another input group 22 is connected to DATA OUT outputs of the several memory modules while an input group 38 is connected to outputs ECH1i, ECH2i of the several memory modules 1. More particularly input group 38 is connected to four pairs of leads (ECH1, ECH2i ... ECH14, ECH24) which define by their logic levels the capacity of several memory modules. Each of such leads is connected to a source of voltage +V through a pull-up resistor, respectively 23, 24 ... 25, 26.

Control unit 6 has a conventional structure except for two features. The first feature is that, owing to a command of control unit 1, control unit 6 transfers to the same central unit, the signals indicative of the capacities of the several memory modules through multiplexer 21 and register 20. More particularly, if central unit 1 sends to unit 6 a command for reading the working memory capacity, a suitable selection command is generated on an output of decoder 19. Such command is applied to a selection input of multiplexer 21 through a lead SEL 28, and selects input group 38. The second feature of control unit 6 allows transferring information to some registers of module selection unit MSU 7 through register 12, demultiplexer 14 and channel 30. This operation is performed when a suitable command sent by central unit 1 is received. Such command, stored in register 13 and decoded by decoder 19, generates, on lead 48, a signal LD which enables the loading of suitable registers of module selection unit 7.

Figure 4:
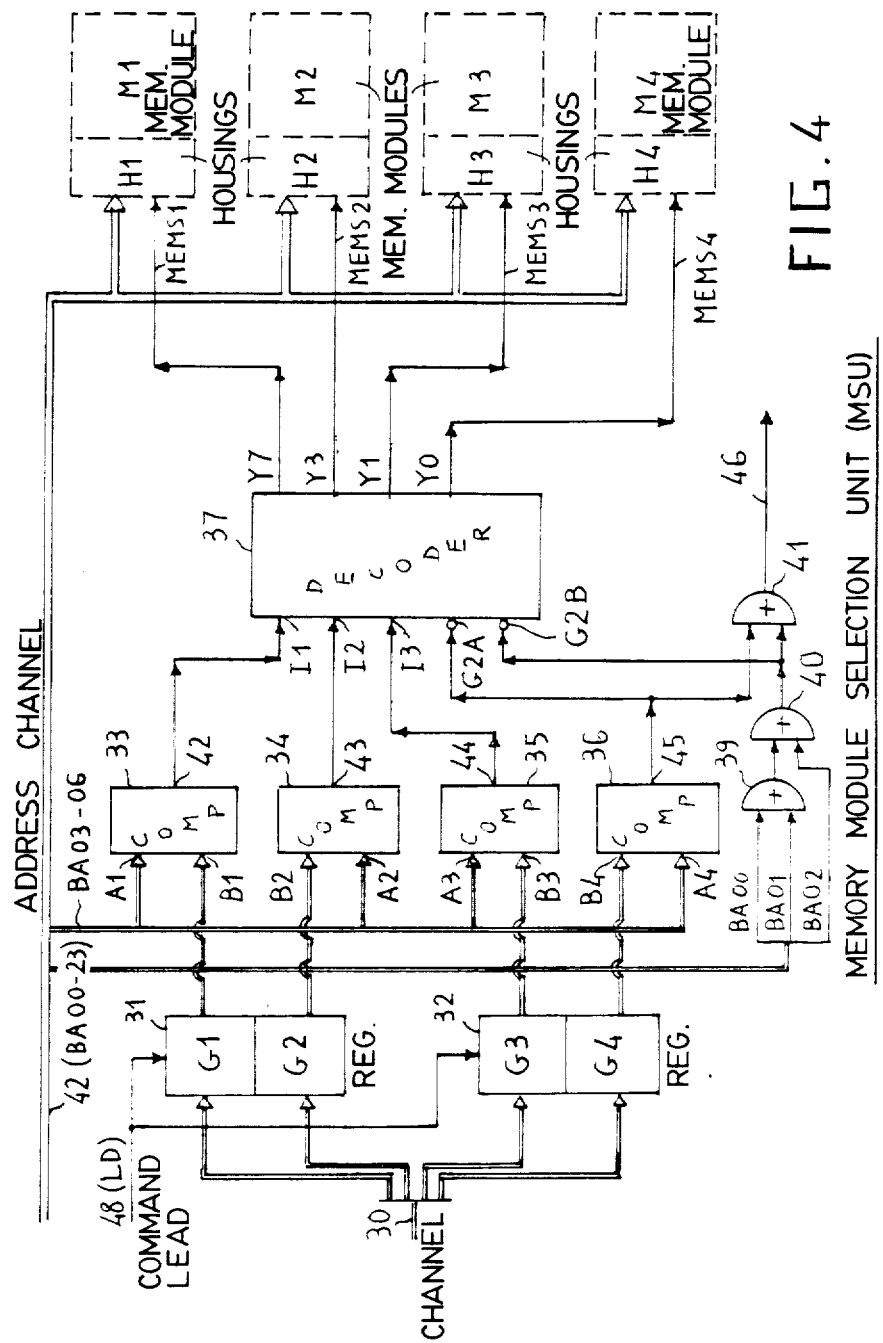
FIG. 4 shows the memory module selection unit.

FIG. 4 shows circuits of memory module selection units MSU 7. Such unit comprises two 8 bit registers 31, 32 in parallel, four 4 bit comparators 33, 34, 35, 36, a decoder 37 and three two-input OR gates 39, 40, 41. Selection unit 7 is coupled to control unit 6 via channel 30, address channel 42 and command lead 48. The 16 bit channel 30 is connected to the inputs of registers 31, 32. Lead 48 is connected to the enabling input of registers 31, 32. When loading command LD on lead 48 binary information comprised of four 4 bit groups is loaded into registers 31, 32. The meaning of such four bit groups (G1, G2, G3, G4) will be seen infra.

The outputs of registers 31, 32 corresponding to groups G1, G2, G3, G4 are respectively connected to four 4 bit input groups B1, B2, B3, B4 of comparators 33, 34, 35, 36 respectively. Each of the comparators is provided with a second input group A1, A2, A3, A4 connected to leads BA 03–06 of address channel 42. Comparators 33, 34, 35, 36 compare the binary code present on inputs Ai with the binary code present on inputs Bi and supply on an output, respectively 42, 43, 44, 45, a signal at logic level 1 respectively for B1>A1, B2>A2, B3>A3, A4>B4. The comparators are suitably chosen from devices available in the market as integrated circuits with reduced propagation time. For instance the comparator circuit 74S85 of Texas Instruments has a maximum signal propagation time from input to output equal to 16.5 nsec and may be suitably used in the present invention. Comparator 74S85 has three different outputs respectively for signalling with a signal at logic level 1 and providing the following comparisons: A>B, A<B, A=B respectively. Only one of the outputs of comparator 74S85 has to be used in the invention, as previously mentioned. Outputs 42, 43, 44 are connected to selection inputs I1, I2, I3 of decoder 37. Decoder 37, available as an integrated circuit and marketed by Texas Instruments with code 74S138, decodes the binary code present on the selection inputs into a signal at logic level 0 on one of 8 output pins Y0, ... Y7. Only four of such output pins are used in the present application. The maximum propagation time of decoder 74S138 is 15 nsec. Such decoder is also provided with two control inputs G2A, G2B. The logic table giving the working of decoder 74S138 is shown below.

| G2A | G2B | I1 | I2 | I3 | Y0 | Y1 | Y2 | Y3 | Y4 | Y5 | Y6 | Y7 |
|---|---|---|---|---|---|---|---|---|---|---|---|---|
| H | X | X | X | X | H | H | H | H | H | H | H | H |
| X | H | X | X | X | H | H | H | H | H | H | H | H |
| L | L | L | L | L | L | H | H | H | H | H | H | H |
| L | L | L | L | H | H | L | H | H | H | H | H | H |
| L | L | L | H | L | H | H | L | H | H | H | H | H |
| L | L | L | H | H | H | H | H | L | H | H | H | H |
| L | L | H | L | L | H | H | H | H | L | H | H | H |
| L | L | H | L | H | H | H | H | H | H | L | H | H |
| L | L | H | H | L | H | H | H | H | H | H | L | H |
| L | L | H | H | H | H | H | H | H | H | H | H | L |

Symbols L, X, H respectively indicate that the signals present on the inputs/outputs are at electrical/logical level 0, at level 1/0 and at electrical/logical level 1. Output 45 of comparator 36 is connected to control input G2A of decoder 37 and to a first input of OR gate 41. Leads BA 00, BA 01 of address channel 42 are connected to inputs of OR gate 39. Output of OR gate 39 is connected to an input of OR gate 40 whose second input is connected to lead BA 02 of address channel 42. Output of OR gate 40 is connected to control input G2B of decoder 37 and to second input of OR GATE 41. Output Y7 of decoder 37 is connected, through lead MEMS1 and a socket connector of housing Hi, to the corresponding installed module and provides it with a selection signal. Likewise outputs Y3, Y1, Y0 are respectively connected, through leads MEMS2, MEMS3, MEMS4 and socket connectors of housings H2, H3, H4, to the corresponding installed modules.

The operation of the memory module selection unit and of the whole selection apparatus is very simple.

During the system initialization, central unit 1 sends to memory control unit 6 a command for reading the capacity of the installed working memory. Responsive to such command, central unit 1 receives through multiplexer 21, register 20 and channel 3, the binary codes representative of the memory capacties of each of the modules installed into the available memory housings H1, H2, H3, H4. Such codes are converted, by using the internal resources of the central unit, into 4-bit codes G1, G2, G3, G4 having the following meaning:

G1: represents the capacity of module M1 per multiples of the unitary capacity of 128K words. For instance:
if G1=0000, module M1 is missing;
if G1=0001, the capacity is of 128K words;
if G1=0010, the capacity is of 256K words;
if G1=0100, the capacity is of 512K words.

G2: represents the sum of the capacities of module M1, M2 per multiples of the unitary capacity of 128K words. For instance, if the capacity of each of modules M1, M2 is 512K words, it will be G2=1000. If both modules are missing, it will be G2=0000. For intermediate value of capacity, G2 will have an intermediate binary value.

G3: represents the sum of the capacities of modules M1, M2, M3 per multiples of the unitary capacity of 128K words. G3 may have different binary values included between 0000 and 1100.

G4: represents the sum minus one of the capacities of modules M1, M2, M3, M4 per multiples of the unitary capacity of 128K words. Because at least one module must be present, G4 may assume different binary values included between 0000 and 1111.

Responsive to a write command, central unit 1 sends to memory selection unit 7, through channel 3 and memory control unit 6, codes G1, G2, G3, G4 which are loaded into registers 31, 32 by means of command LD. At this point selection unit 7 is ready for selecting the several memory modules. In fact, when the memory is addressed, the addressing bits present on leads BA0-0-BA 06 are sent to selection unit 7. The binary code expressed by such bits represent per multiples of 128K, and except for a remainder expressed by bits BA07-23, the memory address.

Bits BA00-BA02 are checked to be equal to 0. In fact, even if only one of bits BA00-BA02 is equal to 1, it indicates that the memory address exceeds the maximum memory capacity which may be installed. This check operation is performed by OR gates 39, 40. Output of OR gate 40 is at logical level 1 if the above mentioned condition occurs. However even if the installed capacity is less than the maximum installable capacity, it must check that bits BA03-BA06 also do not represent a memory address greater than the installed capacity. Such check operation is performed by comparator 36. In fact, if A4 (that is the code expressed by bits BA0-3-06) is less than or equal to B4 (condition A4 B4 false), it indicates that the memory address (neglecting the less significant bits) is less than or equal to the installed capacity reduced by a unitary capacity of 128K and therefore, even considering the less significant bits, the memory address is less than or equal to the installed capacity. However, if A4 is greater than B4, this indicates that the memory address is greater than the installed capacity. For such condition, output 45 of comparator 36 is raised to logic level 1 and, through input G2A, locks all the outputs of decoder 38 to logic level 1. Utilizing OR gate 41, a memory overflow signal is generated on lead 46; such signal is sent to central unit 1 as an error signal via bus 3. It is clear that the memory overflow condition occurs also if only one of bits BA00, BA01, BA02 is at logic level 1.

For example, assuming that the memory address is less than the installed capacity, the module selection is performed by comparators 33, 34, 35. In fact, if the compared address part is less than B1, B2, B3, this means that the capacity of the first module exceeds the memory address. In such case output 42, 43, 44 of the comparators will all be at logic level 1 (B1>A1, B2>A2, B3>A3); output Y7 of decoder 37 will be at logic level 0 and will provide selection signal MEMS1 at logic level 0 memory module M1. If condition B1>A1 is not verified by the other conditions are verified, this indicates that the memory address is greater than the capacity of the first module but not less than the sum of the capacities of the first and second module. For such condition, it is easy to observe from the logic table already seen that output Y3 of decoder 37 falls to logic level 0. Output Y3 is connected to selection input of module M2 and provides selection of such module with signal MEMS2 at logic level 0. Likewise, if conditions B1>A1, B2>A2 are not verified but B3>A3 is verified, this indicates that memory address is greater than the sum of capacity of first and second module but lower than the sum of first, second and third module. For such a condition it is noticed from the logic table already provided that output Y1 of decoder 37 falls to logic level 0.

Output Y1 is connected to selection input of module M3 and provides selection of such module with signal MEMS3 at logic level 0. Finally, if none of conditions B1>A1, B2>A2, B3>A3 is verified, this indicates that the memory address is greater than the sum of the capacities of the first, second and third module. For such condition output Y0 of decoder 37 falls to logic level 0.

Output Y0 is connected to the selection input of module M4 and provides selection of such module with signal MEMS4 at logic level 0.

Therefore, except for the memory overflow condition when an error signal is generated, selection unit 7 provides for sending a selection signal to the proper module with a maximum delay not greater than 30+31 ns from the time that it receives the address bits. The circuit structure of the selection unit of the invention is particularly simple and inexpensive because all the logic sum and subtraction networks used inside the selection units of the prior art, are no more required. In the present invention the operations for computing the installed capacity are assigned to the central unit and are performed during the system initialization or during a possible memory reconfiguration due to addition/removal/substitution of memory modules. Such assignment can also be made for a memory module that is malfunctioning. In that case, even if the faulty module is physically left in the memory, it may be logically excluded by the central unit which assigns to it a memory capacity of 0. This involves a logic memory reconfiguration which allows the module selection unit to define a continuous memory space comprised of the working modules preceding the faulty module and by the working modules following the faulty module. Of course the above memory reconfiguration is also valid if several modules are faulty at the same time.

In the invention, comparisons are performed between the capacities of the installed memory modules and the most significant bits of the memory address and another comparison is performed between the memory capacity minus a unitary capacity (equal to the maximum capacity addressable by means of the less significant address bits which are not used in the comparison operation) and the most significant bits of the memory address.

The above comparison permits the reduction to a minimum of the parallelism of the comparators. Moreover memory modules may be inserted in an absolutely random way, thus leaving empty intermediate positions.

Having shown and described one embodiment of the invention, those skilled in the art will realize that many variations and modifications can be made to produce the described invention and still be within the spirit and scope of the claimed invention. It is the intention, therefore, to be limited only as indicated by the scope of all of the claims.

What is claimed is:

1. A memory module selection and reconfiguration apparatus for a data processing system, said data processing system comprising a central unit and a modular working memory connected to said central unit by a communication bus including data and address lines, said working memory including a memory control unit, a plurality of n ordered housings each for housing a memory module with memory capacity equal to or multiple of a minimum capacity, and at least a memory module in one of said housings, said memory module selection and reconfiguration apparatus comprising:

first means in each of the modules for generating a plurality of first binary codes, one code for each module, each of said first codes being representative of the memory capacity of the generating module;

second means in said memory control unit for receiving said first binary codes and for transferring to said central unit said first binary codes through said communication bus, responsive to commands from said central unit;

third means in said memory control unit for receiving from said central unit and through said bus memory addresses and second binary codes, one code for each memory housing, each of said second codes being representative of the cumulative memory capacity of the modules installed in the related housing and into the preceding ordered housings;

a memory module selector in said memory having (a) inputs connected to said third means for receiving said second binary codes and addresses on a predetermined portion of said memory address lines, (b) a plurality of registers, one register for each memory housing irrespective of the presence or absence of memory module in the housing, each for storing one of said second binary codes, (c) a plurality of comparators, one and only one comparator for each memory housing irrespective of the presence or absence of the memory module in the housing, each of said comparators receiving as input said predetermined portion of said memory address lines and the second binary code related to the corresponding memory housing, each of said comparators providing as output a binary signal indicative of the comparison performed between the second binary code and said memory address portion received as input, and (d) a decoder provided with inputs for receiving said binary signal from each of said comparators and with a plurality of outputs, each of said outputs being coupled to a memory housing, said decoder providing on a selected one of said outputs and in response to said binary signals received from said comparator a module selection signal, said module selection signal being received by a selection input of the module installed into the related housing.

2. A memory module selection and reconfiguration apparatus for a data processing system, said data processing system comprising a central unit and a modular working memory connected to said central unit by a communication bus including data address lines, said working memory including a memory control unit, a plurality of n ordered housings each for housing a memory module with memory capacity equal to or multiple of a minimum capacity and at least a memory module in one of said housings, said memory module selection and reconfiguration apparatus comprising:

first means in each of the modules for generating a plurality of first binary codes, one code for each module, each of said first codes being representative of the memory capacity of the generating module;

second means in said memory control unit for transferring to said central unit said first binary codes through said communication bus, responsive to commands from said central unit;

third means in said memory control unit for receiving from said central unit and through said bus memory addresses and n second binary codes, one code for each memory housing, n-1 of said second codes being representative of the cumulative memory capacity of the module installed in the related housing and into the preceding ordered housing, the $n^{th}$ of said second codes, being representative of the cumulative memory capacity of the module installed in the $n^{th}$ ordered housing and into the preceding ordered housing less said minimum capacity;

a memory module selector in said memory, having (a) inputs connected to said third means for receiving said second binary codes and addresses on a predetermined portion of said memory address lines, (b) a plurality of registers, one register for each memory housing irrespective of the presence or absence of the memory module in the housing, each for storing one of said second binary codes, a plurality of comparators, one and only one comparator for each memory housing irrespective of the presence or absence of the memory module in the housing, each of said comparators receiving as input said predetermined portion of said memory address lines and the second binary code related to the corresponding memory housing, each of said comparators providing as output a binary signal indicative of the comparison performed between the second binary code and said memory address portion received as input, and (d) a decoder provided with inputs for receiving said binary signal from each of said comparators and with a plurality of outputs, each of said outputs being coupled to a memory housing, said decoder providing on a selected one of said outputs and in response to said binary signals received from said comparator a module selection signal, said module selection signal being received by a selection input of the module installed into the related housing.

* * * * *